US009500914B2

United States Patent
Park et al.

(10) Patent No.: US 9,500,914 B2
(45) Date of Patent: Nov. 22, 2016

(54) LIQUID CRYSTAL DISPLAY APPARATUS AND MANUFACTURING METHOD THEREOF

(71) Applicant: Samsung Display Co., Ltd., Yongin (KR)

(72) Inventors: Jae Hong Park, Seoul (KR); Ohjeong Kwon, Hwaseong-si (KR); Dong-Chul Shin, Seoul (KR); Heungshik Park, Seoul (KR); Hyeokjin Lee, Seongnam-si (KR); Kichul Shin, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 106 days.

(21) Appl. No.: 14/523,471

(22) Filed: Oct. 24, 2014

(65) Prior Publication Data

US 2015/0301413 A1    Oct. 22, 2015

(30) Foreign Application Priority Data

Apr. 17, 2014   (KR) .......................... 10-2014-0046176

(51) Int. Cl.
  *G02F 1/1343*   (2006.01)
  *G02F 1/1337*   (2006.01)
(52) U.S. Cl.
  CPC ... *G02F 1/134309* (2013.01); *G02F 1/133707* (2013.01); *G02F 2001/134345* (2013.01)
(58) Field of Classification Search
  CPC ....................... G02F 1/133707; G02F 1/34309
  USPC ......................................................... 349/139
  See application file for complete search history.

(56) References Cited

U.S. PATENT DOCUMENTS

| | | | | |
|---|---|---|---|---|
| 2010/0123867 A1* | 5/2010 | Jung | ................. | G02F 1/133753 349/141 |
| 2011/0317119 A1* | 12/2011 | Jung | ................. | G02F 1/133753 349/143 |
| 2012/0249902 A1* | 10/2012 | Seok | ................. | G02F 1/133753 349/33 |
| 2013/0002625 A1* | 1/2013 | Liao | ................. | G02F 1/134309 345/205 |

(Continued)

FOREIGN PATENT DOCUMENTS

KR   10-2009-0103461    10/2009
KR   10-2013-0101329    9/2013

(Continued)

*Primary Examiner* — Thanh-Nhan P Nguyen
(74) *Attorney, Agent, or Firm* — H.C. Park & Associates, PLC

(57) ABSTRACT

Provided is a liquid crystal display apparatus. The liquid crystal display apparatus may include a first pixel electrode, a second pixel electrode, a common electrode, and a liquid crystal layer. The first pixel electrode is disposed in a first area, and includes a plurality of outer branches spaced apart from each other. The second pixel electrode is disposed in a second area spaced apart from the first area with an electrode gap therebetween and surrounded by the first area, and includes a plurality of middle branch portions spaced apart from each other. An extending direction of the electrode gap forms one of an acute angle or an obtuse angle with an extending direction of each of the outer branch portions, and the extending direction of the electrode gap forms one of an acute angle or an obtuse angle with an extending direction of each of the middle branch portions.

17 Claims, 7 Drawing Sheets

(56) References Cited

U.S. PATENT DOCUMENTS

2015/0168789 A1   6/2015  Kwon et al.

FOREIGN PATENT DOCUMENTS

| KR | 10-2013-0104029 | 9/2013 |
| KR | 1020150071550 | 6/2015 |

\* cited by examiner

LIQUID CRYSTAL DISPLAY APPARATUS AND MANUFACTURING METHOD THEREOF

CROSS-REFERENCE TO RELATED APPLICATIONS

This U.S. non-provisional patent application claims priority under 35 U.S.C. §119 of Korean Patent Application No. 10-2014-0046176, filed on Apr. 17, 2014, the entire contents of which are hereby incorporated by reference.

BACKGROUND OF THE INVENTION

The present disclosure relates to a liquid crystal display apparatus and a manufacturing method thereof, and more particularly, to a liquid crystal display apparatus and a manufacturing method thereof capable of reducing the appearance of a texture in a liquid crystal layer.

A typical display apparatus includes a first substrate having a plurality of pixel electrodes corresponding to a plurality of pixels, a second substrate on which a common electrode is formed, the second substrate facing the first substrate, and a liquid crystal layer interposed between the first substrate and the second substrate. In the liquid crystal layer, orientations of liquid crystal molecules are changed by an electric field formed by a data voltage applied to the pixel electrodes and a common voltage applied to the common electrode. Light transmittance is adjusted according to the arrangements of the liquid crystal molecules and thus, an image is displayed.

Liquid crystal displays have poor viewing angle performance as compared to other types of displays. When the side visibility is comparable to the front visibility, the viewing angle performance may be improved. In order to improve the viewing angle performance, driving methods, such as a Patterned Vertical Alignment (PVA) mode, a Multi-domain Vertical Alignment (MVA) mode, a Super-Patterned Vertical Alignment (S-PVA) mode, and the like have been developed.

Each pixel in an S-PVA mode display apparatus includes a first pixel electrode receiving a high voltage and a second pixel electrode receiving a low voltage. Since the first and second pixel electrodes are spaced apart from each other, the orientation of liquid crystal molecules between the first and second pixel electrodes is not determined by the electrodes, and thus the appearance of a texture in the display is generated.

SUMMARY OF THE INVENTION

The present disclosure provides a liquid crystal display apparatus and a manufacturing method thereof capable of reducing the appearance of a texture that is visible in an area between pixel electrodes.

The object of the present invention is not limited to the aforesaid, but other objects not described herein will be clearly understood by those skilled in the art from descriptions below.

Embodiments of the present invention provide liquid crystal display apparatuses including a first pixel electrode disposed in a first area, and including a plurality of outer branches spaced apart from each other. A second pixel electrode is disposed in a second area spaced apart from the first area with an electrode gap therebetween, surrounded by the first area and including a plurality of middle branch portions spaced apart from each other. A common electrode faces the first pixel electrode and the second pixel electrode. A liquid crystal layer is positioned within the display apparatus and includes a plurality of liquid crystal molecules. The orientation of the liquid crystal molecules is changed by a voltage applied to the first pixel electrode, the second pixel electrode, and the common electrode. An extending direction of the electrode gap forms one of an acute angle or an obtuse angle with an extending direction of each of the outer branch portions, and the extending direction of the electrode gap forms one of an acute angle or an obtuse angle with an extending direction of each of the middle branch portions.

In some embodiments, the second pixel electrode may further include a horizontal stem portion extending in a first direction and a vertical stem portion extending in a second direction perpendicular to the first direction to intersect the horizontal stem portion.

In other embodiments, an extending direction of the electrode gap may be the first direction and the second direction.

In other embodiments, the middle branches may be obliquely connected to the horizontal stem portion and the vertical stem portion.

In other embodiments, the horizontal stem portion and the vertical stem portion may partition the second area into a plurality of middle domains, and the middle branch portions in each of the middle domains may extend parallel to each other and an extending orientation direction of the middle branch portions in one middle domain may be different from that in another middle domain.

In other embodiments, each of the middle domains may have a substantially square shape.

In further embodiments, the second pixel electrode may further include an upper horizontal stem portion extending in the first direction, spaced apart from the horizontal stem portion and obliquely connected to the middle branches and a lower horizontal branch portion extending in the first direction, spaced apart from the horizontal portion, facing the upper horizontal stem portion with the horizontal stem portion therebetween and obliquely connected to the middle branch portions.

In further embodiments, each of the upper horizontal stem portion and the lower horizontal stem portion may have a width in a range of about 1 μm to about 5 μm.

In further embodiments, a shape formed by the upper horizontal stem portion, the lower horizontal stem portion, the middle branch portions, and slits between the middle branch portions may be substantially a square shape.

In further embodiments, the upper horizontal stem portion, the lower horizontal stem portion, and the vertical stem portion partition the first area into a plurality of outer domains, the outer branch portions in each of the outer domains may extend parallel to each other and an extending direction of the outer branch portions in one outer domain may be different from that in another outer domain.

In further embodiments, each of the outer domains may have a square shape or a rectangular shape.

In further embodiments, the middle domains may include first to fourth domains adjacent to each other, and the outer domains may include first to fourth outer domains adjacent to each of the first to the fourth middle domains within each of areas that is partitioned by the horizontal stem portion and the vertical stem portion.

In further embodiments, the middle branch portions may include a first middle branch portion disposed within the first middle domain, a second middle branch portion disposed within the second middle domain, a third middle branch portion disposed within the third middle domain, and a fourth middle branch portion disposed within the fourth middle domain.

In further embodiments, the outer branch portions may include a first outer branch portion disposed within the first outer domain, a second outer branch portion disposed within the second outer domain, a third outer branch portion disposed within the third outer domain, and a fourth outer branch portion disposed within the fourth outer domain.

In further embodiments, the first middle branch portion and the first outer branch portion may extend in the same direction, the second middle branch portion and the second outer branch portion may extend in the same direction, the third middle branch portion and the third outer branch portion may extend in the same direction, and the fourth middle branch portion and the fourth outer branch portion may extend in the same direction.

In further embodiments, the first pixel electrode may further include an edge portion formed along an edge of the first area, the edge portion being obliquely connected to the outer branch portions.

In other embodiments of the inventive concept, methods of manufacturing a liquid crystal display apparatus include forming a first substrate comprising a first pixel electrode disposed in a first area, and comprising a plurality of outer branches spaced apart from each other. A second pixel electrode is disposed in a second area spaced apart from the first area with an electrode gap therebetween, surrounded by the first area, and including a plurality of middle branch portions spaced apart from each other. An extending direction of the electrode gap forms one of an acute angle or an obtuse angle with an extending direction of each of the outer branch portions, and the extending direction of the electrode gap forms one of an acute angle or an obtuse angle with an extending direction of each of the middle branch portions. A second substrate has a common electrode formed thereon. A liquid crystal layer including a prepolymer is formed between the first substrate and the second substrate. A first voltage is applied between the first pixel electrode and the common electrode, and a second voltage different from the first voltage is applied between the second pixel electrode and the common electrode to orient the liquid crystal molecules in the liquid crystal layer.

An orientation of the molecules of the liquid crystal layer is fixed by irradiating the liquid crystal and prepolymer layer to polymerize the prepolymer.

In some embodiments, a voltage ratio of the second voltage to the first voltage may be between about 0.9 and about 1.

BRIEF DESCRIPTION OF THE DRAWINGS

The accompanying drawings are included to provide a further understanding of the present invention, and are incorporated in and constitute a part of this specification. The drawings illustrate exemplary embodiments of the inventive concept and, together with the description, serve to explain principles of the inventive concept. In the drawings.

DETAILED DESCRIPTION OF PREFERRED EMBODIMENTS

The inventive concept may be modified in several different forms, and specific embodiments will be exemplified in the FIGS. and described in detail. It is to be understood that the invention is not limited to the disclosed embodiments, but, on the contrary, is intended to cover various modifications and equivalent arrangements included within the spirit and scope of the disclosure, including the appended claims.

Hereinafter, exemplary embodiments of the inventive concept will be described in more detail with reference to the accompanying drawings.

Figure 1:
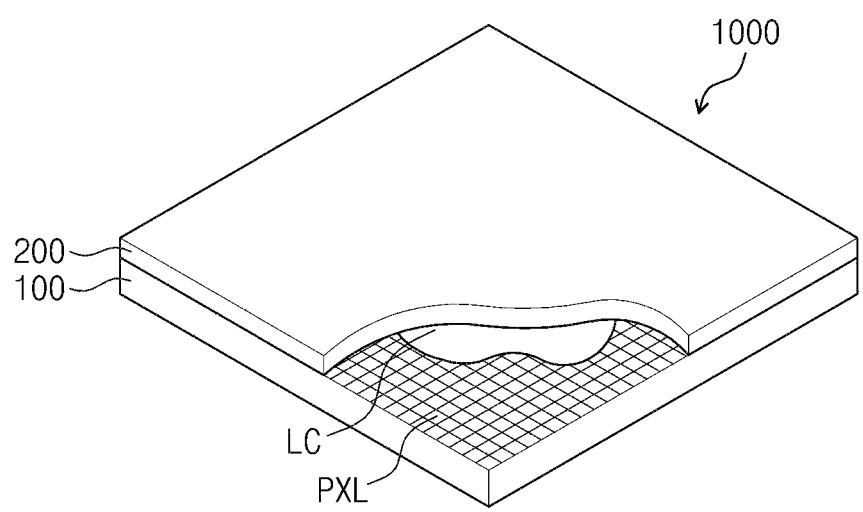
FIG. 1 is a perspective view illustrating a liquid crystal display apparatus according to an embodiment of the inventive concept.

FIG. 1 is a perspective view illustrating a liquid crystal display apparatus 1000 according to an embodiment.

Referring to FIG. 1, the liquid crystal display apparatus 1000 includes a first substrate 100, a second substrate 200, and a liquid crystal layer LC.

A plurality of pixel areas PXL may be defined on the first substrate 100. A pixel may be provided to each of the pixel areas. The second substrate 200 may face the first substrate 100. The liquid crystal layer LC may be disposed between the first substrate 100 and the second substrate 200.

Each pixel may include two different sub pixels. Each of the sub pixels may include a pixel electrode provided to the first substrate 100 and a common electrode provided to the second substrate 200. Since the two sub pixels are charged with different voltages from each other, they may represent gray scale values different from each other. Details thereof will be described later.

The liquid crystal layer LC includes a plurality of liquid crystal molecules having dielectric anisotropy. The liquid crystal molecules of the liquid crystal layer LC rotate in a specific direction between the first substrate 100 and the second substrate 200 when an electric field is formed between the pixel electrode and the common electrode, thereby adjusting transmittance of light that is incident into the liquid crystal layer LC.

The liquid crystal display apparatus 1000 may further include a back light unit (not shown) disposed under the first substrate 100. The back light unit plays a role in providing light to the first substrate 100.

Figure 2:
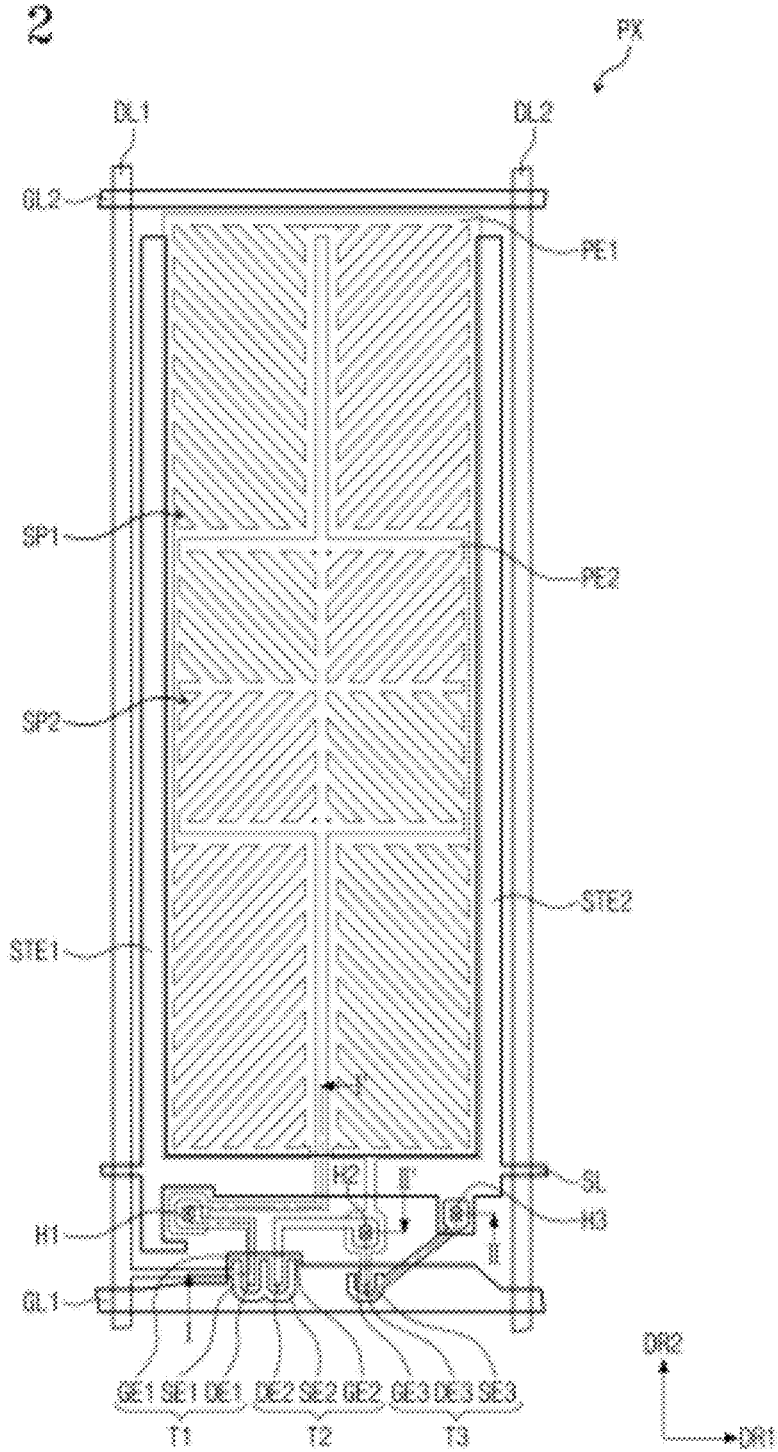
FIG. 2 is a plan view illustrating a liquid crystal display apparatus according to an embodiment of the inventive concept.
Figure 3:
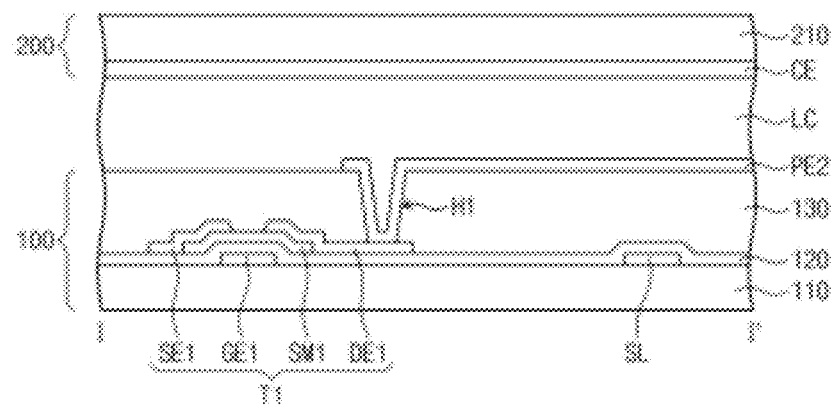
FIG. 3 is a cross-sectional view taken along line I-I' of FIG. 2.
Figure 4:
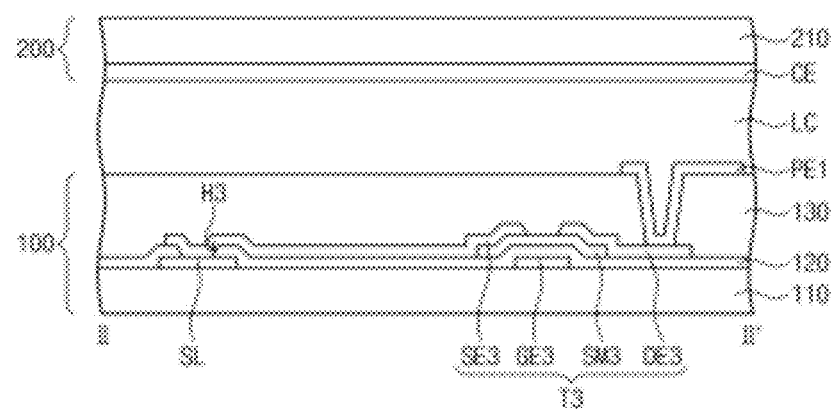
FIG. 4 is a cross-sectional view taken along line I-I' of FIG. 2.

FIG. 2 is a plan view illustrating a liquid crystal display apparatus according to an embodiment of the inventive concept, FIG. 3 is a cross-sectional view taken along line I-I' of FIG. 2, and FIG. 4 is a cross-sectional view taken along line II-II' of FIG. 2.

Although only one pixel is shown in FIG. 3, other pixels may have the same configuration. Hereinafter, the configuration of one pixel will be described for convenience of description.

Referring to FIGS. 2 to 4, the first substrate 100 includes a first insulating substrate 110, gate lines GL1 and GL2, data lines DL1 and DL2, storage electrode portions SL, STE1, and STE2, a plurality of thin film transistors T1, T2, and T3, and pixel electrodes PE1 and PE2. In FIG. 2, the gate lines GL1 and GL2 are shown as an example in which first gate line GL1 and second gate line GL2 are spaced apart from each other, and the data lines DL1 and DL2 are shown as an example in which first gate line DL1 and second gate line DL2 are spaced apart from each other.

The thin film transistors T1, T2, and T3 may include first to third thin film transistors T1, T2, and T3.

The pixel electrodes PE1 and PE2 may include first electrode PE1 and second electrode PE2 disposed directly on the same layer. The pixel electrodes PE1 and PE2 may be formed of a transparent conductive material, such as indium tin oxide (ITO), indium zinc oxide (IZO), indium tin zinc oxide (ITZO) or the like.

The first insulating substrate 110 is a transparent or semi-transparent substrate, and may be formed of silicon, glass, or plastic.

The gate lines GL1 and GL2 may be formed on the first insulating substrate and extend in a first direction DR1. A first insulating film 120 may be formed on the insulating substrate 110 to cover the gate lines GL1 and GL2. The first insulating film 120 may be formed of an organic insulating material or an inorganic insulating material. For example, the first insulating film may include silicon nitride or silicon oxide. The data lines DL1 and DL2 may be electrically insulated from and intersected with the gate lines GL1 and GL2. The data lines DL1 and DL2 may extend in a second direction DR2 that intersects with the first direction DL1. Meanwhile, an arrangement is not limited to the above described arrangement and the arrangement between the gate lines GL1 and GL2 and the data lines DL1 and DL2 may be changed according to embodiments. For example, in other embodiments of the inventive concept, the gate lines may be disposed on the data lines.

The storage electrode portions SL, STE1, and STE2 may be disposed on the same layer as the gate lines GL1 and GL2, and spaced apart from the gate lines GL1 and GL2. The storage electrode portions SL, STE1, and STE2 may include a storage line SL, a first storage electrode STE1, and a second storage electrode STE2. The storage line SL may be spaced apart from the gate lines GL1 and GL2 in the second direction DR2, and extend in the first direction DR1. The storage line SL may overlap with side ends of the pixel electrodes PE1 and PE2 adjacent to the first gate line GL1 and extend in the first direction DR1. Each of the first storage electrode STE1 and the second storage electrode STE2 may be branched from the storage line SL. The first storage electrode STE1 may overlap side ends of the pixel electrodes PE1 and PE2 adjacent to the data line DL1 and extend in the second direction DR2. The second storage electrode STE2 may overlap side ends of the pixel electrodes PE1 and PE2 adjacent to the data line DL2 and extend in the second direction DR2. The storage line SL, the first storage electrode STE1, and the second storage electrode STE2 may have a storage voltage applied thereto.

The second substrates 200 may include a second insulating substrate 210 and a common electrode CE.

The second insulating substrate 210 is a transparent or semi-transparent insulating substrate, and may be formed of silicon, glass, or plastic. The common electrode CE is formed on the second insulating substrate 210. The common electrode CE may be disposed facing the first pixel electrode PE1 and the second electrode PE2 with the liquid crystal layer LC therebetween. The common electrode CE may be formed of a transparent conductive material, such as indium tin oxide (ITO), indium zinc oxide (IZO), indium tin zinc oxide (ITZO), or the like.

Although not shown, the second substrate 200 may further include a color filter disposed on the second insulating layer 210. The color filter may include at least one of red, green, and blue filters.

The pixel PX includes a first sub pixel SP1 and a second sub pixel SP2. The first sub pixel SP1 includes the second thin film transistor T2, the third thin film transistor T3, the first pixel electrode PE1, and a first portion of the common electrode CE. The second sub pixel SP2 includes the first thin film transistor T1, the second pixel electrode PE2, and a second portion of the common electrode CE. The first portion of the common electrode CE may be defined to have the same shape and size as the first pixel electrode PE1, and the second portion of the common electrode CE may be defined to have the same shape and size as the second pixel electrode PE2 on a plane.

The first pixel electrode PE1 partially overlaps the storage line SL, the first storage electrode STE1, and the second storage electrode STE2 to form first storage capacitor. The first storage capacitor plays a role in maintaining a voltage charge between the first pixel electrode PE1 and the common electrode CE during one frame.

The second pixel electrode PE2 partially overlaps the storage line SL, the first storage electrode STE1, and the second storage electrode STE2 to form a second storage capacitor. The second storage capacitor plays a role in maintaining a voltage charge between the second pixel electrode PE2 and the common electrode CE during one frame.

The first thin film transistor T1 may be connected to the first gate line GL1, the first data line DL1, and the second pixel electrode PE2.

The first thin film transistor T1 includes a first gate electrode GE1, a first source electrode SE1, a first drain electrode DE1, and a first semiconductor layer SM1.

The first gate electrode GE1 is formed branched from the first gate line GL1. The first insulating film 120 may be formed on the first gate electrode GE1 to cover the first gate electrode GE1. The first semiconductor layer SM1 is formed on the first insulating film 120. Although not shown, the first semiconductor SM1 may include an active layer and an ohmic contact layer.

The first source electrode SE1 and the first drain electrode DE1 are formed spaced apart from each other on the first insulating film 120. The first source electrode SE1 is formed branched from the first data line DL1. The first semiconductor layer SM1 forms a conductive channel between the first source electrode SE1 and the first drain electrode DE1.

A passivation film 130 is formed on the first source electrode SE1 and the first drain electrode DE1. The passivation film 130 may be formed of an organic insulating material or an inorganic insulating material. The passivation film 130 has a first contact hole H1 exposing a portion of the first drain electrode DE1. The first pixel electrode PE1 may be electrically connected to the first drain electrode DE1 through the first contact hole H1.

The second thin film transistor T2 may be connected to the first gate line GL1, the first data line DL1, and the first pixel electrode PE1.

The second thin film transistor T2 includes a first gate electrode GE2, second source electrode SE2, a second drain electrode DE2, and a second semiconductor layer.

Each of elements constituting the second thin film transistor T2 may be disposed on the same plane as each of corresponding elements constituting the first thin film transistor T1. Hereinafter, a planar structure of each of the elements constituting the second thin film transistor T2 will be described, and description of a cross-sectional structure is omitted.

The second gate electrode GE2 is formed branched from the first gate line GL1. The second gate electrode GE2 may be integrally formed with the gate electrode GE1.

The second source electrode SE2 and the second drain electrode DE2 are spaced apart from each other. The second source electrode SE2 may be formed connected to the first source electrode SE1. The second semiconductor layer forms a conductive channel between the source electrode SE2 and the second drain electrode DE2.

The passivation film 130 has a second contact hole H2 exposing a portion of the second drain electrode DE2. The second pixel electrode PE2 may be electrically connected to the second drain electrode DE2 through the second contact hole H2.

The third thin film transistor T3 may be connected to the first gate line GL1, the storage line SL, and the second pixel electrode PE1.

The third thin film transistor T3 includes a third gate electrode GE3, a third source electrode SE3, a third drain electrode DE3, and a third semiconductor layer SM3.

Each of elements constituting the third thin film transistor T3 may be disposed on the same layer as each of corresponding elements constituting the first thin film transistor T1. Hereinafter, a planar structure of each of the elements constituting the third thin film transistor T3 will be described, and description of a cross-sectional structure is omitted.

The second gate electrode GE2 is formed branched from the first gate line GL1.

The third source electrode SE3 and the third drain electrode DE3 are formed spaced apart from each other. The second source electrode SE2 may be connected to the storage line SL. The third drain electrode DE3 may be connected to the second drain electrode DE2. The third semiconductor layer SM3 forms a conductive channel between the third source electrode SE3 and the third drain electrode DE3.

The first to third thin film transistors T1, T2, and T3 are turned on by a gate signal supplied through the first gate line GL1. A first data voltage applied through the first data line DL1 is applied to the second pixel electrode PE2 through the activated first thin film transistor T1.

A voltage lower than the first data voltage is applied to the first pixel electrode PE1 through the activated second thin film transistor T2 and the activated third thin film transistor T3. The voltage applied to the first pixel electrode PE1 may have a voltage level between the first data voltage applied to the second drain electrode DE2 and a storage voltage applied to the third drain electrode DE3.

The first sub pixel SP1 is charged with a voltage lower than a voltage that is charged to the second sub pixel SP2. When voltages different from each other are applied to the first and second sub pixels SP1 and SP2 of the pixel PX, a user viewing the liquid crystal display apparatus (1000 in FIG. 1) sees a gradation corresponding to an intermediate value of the first and second pixel voltages. In this case, since deterioration of a side viewing angle caused by a distortion of a gamma curve is prevented, side visibility may be improved.

Figure 5:
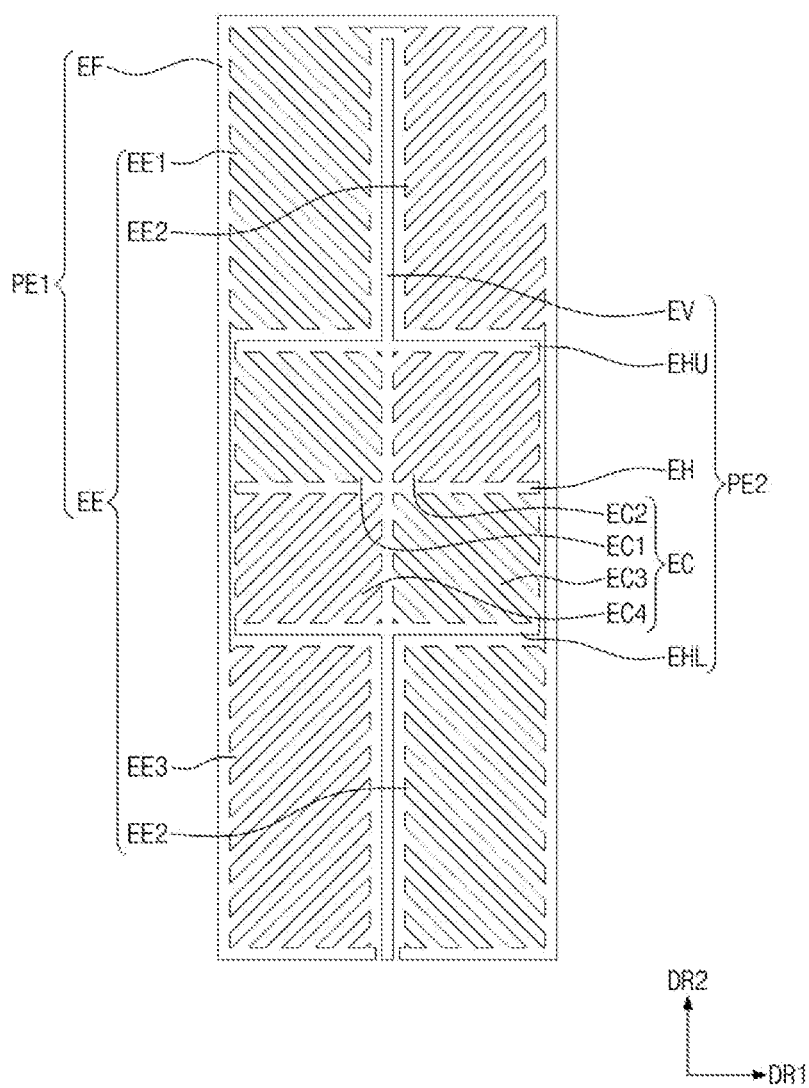
FIG. 5 is a plan view illustrating first and second electrodes of FIG. 2.
Figure 6:
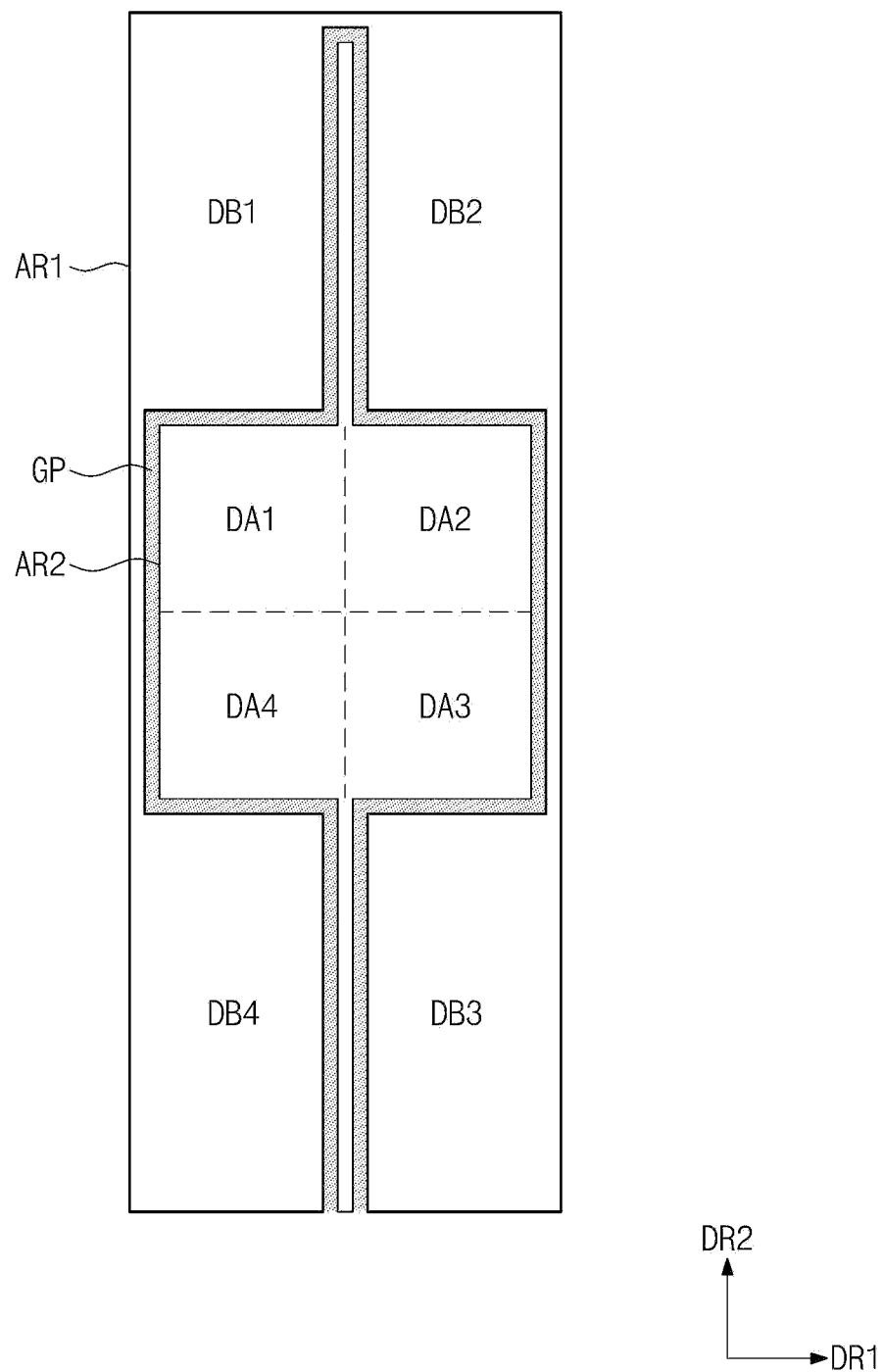
FIG. 6 is a conceptual view illustrating first and second areas.

FIG. 5 is a plan view illustrating the first pixel electrode PE1 and the second pixel electrode PE2 of FIG. 2, and FIG. 6 is a conceptual view illustrating a first area and a second area.

Referring to FIG. 2, FIG. 5 and FIG. 6, the first pixel electrode PE1 may be disposed in the first area AR1, and the second pixel electrode PE2 may be disposed in the second area AR2.

The first area AR1 and the second area AR2 may be portions of an area that are surrounded by the gate lines GL1 and GL2 and the data lines DL1 and DL2 of FIG. 2. The first area AR1 is an area that represents a schematic configuration of the first pixel electrode PE1, and the second area AR2 is an area that represents a schematic configuration of the second pixel electrode PE2. The first area AR1 may be set by lines extending in the first direction DR1 and the second direction DR2, and be a minimum area capable of including the second pixel electrode PE1. The second area AR2 may be set by lines extending in the first direction DR1 and the second direction DR2, and be a minimum area capable of including the second pixel electrode PE2. The second area AR2 may be an area encircled or surrounded by the first area AR1. The first area AR1 does not have a shape in which the inside thereof is closed, but may have a shape entirely surrounding the second area AR2.

The first area AR1 and the second area AR2 may be spaced apart with an electrode gap in-between. Since the electrode gap GP is determined according to the shapes of the first area AR1 and the second area AR2, the electrode gap GP may extend in the first direction DR1 and the second direction DR2.

The first pixel electrode PE1 may include a plurality of outer branch portions EE and edge portion EF.

The outer branch portions EE may be spaced apart from each other. Each of the outer branch portions EE may have a shape that extends lengthwise in a direction intersecting the first direction DR1 and the second direction DR2. For example, as seen in FIG. 5, each of the outer branch portions may extend in a diagonal direction with respect to the directions DR1 and DR2.

The edge portion EF may be formed along an edge of the first area AR1, and be obliquely connected to the outer branch portions EE.

The second pixel electrode PE2 may include a plurality of middle branch portions EC, a horizontal stem portion EH, a vertical stem portion EV, an upper horizontal stem portion EHU, and a lower horizontal stem portion EHL.

The middle branch portions EC may be spaced apart from each other. Each of the middle branches EC may have a shape that extends lengthwise in a direction intersecting the first directions DR1 and the second direction DR2. That is, the middle branches EC may extend is a diagonal direction with respect to the directions DR1 and DR2.

The horizontal stem portion EH may have a shape that extends in the first direction DR1. The vertical stem portion EV may have a shape that extends in the second direction DR2, and intersects the horizontal stem portion EH. The middle branches EC may be obliquely connected to the horizontal stem portion EH and the vertical stem portion EV.

The upper horizontal stem portion EHU may extend in the first direction DR1, and be spaced apart from the horizontal stem portion EH. It is shown in FIG. 5 that the upper horizontal stem portion EHU is disposed above the horizontal stem portion EH. The upper horizontal stem portion EHU may be obliquely connected to the middle branch portions EC.

The lower horizontal stem portion EHL may extend in the first direction DR1, and be spaced apart from the horizontal stem portion EH. The lower horizontal stem portion EHL may be disposed facing the upper horizontal stem portion EHU with the horizontal stem portion EH therebetween. It is shown in FIG. 5 that the lower horizontal stem portion EHL is disposed below the horizontal stem portion EH. The lower horizontal stem portion EHL may be obliquely connected to the middle branch portions EC.

The horizontal stem portion EH and the vertical stem portion EV may partition the second area AR2 into a plurality of middle domains DA1 to DA4. Each of the domains DA1 to DA4 may have a substantially square shape. A shape formed by the upper horizontal stem portion EHU, the lower horizontal stem portion EHL and the middle branch portions EC, and slits between the middle branch portions EC may be a substantially square shape. The middle branch portions EC in each of the middle domains DA1 to DA4 may extend parallel to each other and an extending direction of the middle branch portions EC in one middle domain may be different from that in another middle domain.

The middle domains DA1 to DA4 may include first to fourth domains DA1 to DA4 adjacent to each other. It is shown in FIG. 6 that the middle domain disposed at an upper left portion among the middle domains DA1 to DA4 is labeled as the first middle domain DA1, and the second to fourth middle domains are disposed clockwise with respect to the first domain DA1.

The middle branch portions EC may include first to fourth branch portions EC1 to EC4. The first middle branch portion EC1 may be disposed within the first middle domain DA1, the second middle branch portion EC2 may be disposed within the second middle domain DA2, the third middle branch portion EC3 may be disposed within the third middle domain DA3, and the fourth middle branch portion EC4 may be disposed within the fourth middle domain DA4. The first middle branch portion EC1 may obliquely extend from the horizontal stem portion EH or the vertical stem portion EV towards an upper left side region, the second middle branch portion EC2 may obliquely extend from the horizontal stem portion EH or the vertical stem portion EV towards an upper right side region, the third middle branch portion EC3 may obliquely extend from the horizontal stem portion EH or the vertical stem portion EV towards a lower right side portion, and the fourth middle branch portion EC4 may obliquely extend from the horizontal stem portion EH or the vertical stem portion EV towards a lower left side portion. Liquid crystal molecules of the liquid crystal layer LC that overlap the second pixel electrode PE2 may be obliquely disposed in an extending direction of each of the first to fourth branch portions EC1 to EC4.

The upper horizontal stem portion EHU, the lower horizontal stem portion EHL, and the vertical stem portion EV may partition the first area AR1 into a plurality of outer domains DB1 to DB4. Each of the outer domains DB1 to DB4 may have a substantially square or rectangular shape. The outer branch portions EE in each of the outer domains DB1 to DB4 may extend parallel to each other and an extending direction of the outer branch portions EE in one outer domain may be different from that in another outer domain.

The outer domains DB1 to DB4 may include first to fourth outer domains DB1 to DB4. Each of the outer domains DB1 to DB4 may be adjacent to each of the first to fourth middle domains DA1 to DA4 within each of areas partitioned by the horizontal stem portion EH and the vertical stem portion EV.

The outer branch portions EE may include first to fourth outer branch portions EE1 to EE4. The first outer branch portion EE1 may be disposed within the first outer domain DB1, the second outer branch portion EE2 may be disposed within the second outer domain DB2, the third outer branch portion EE3 may be disposed within the third outer domain DB3, and the fourth outer branch portion EE4 may be disposed within the fourth outer domain DB4. The first outer branch portion EE1 may extend parallel to the first middle branch portion EC2, the second outer branch portion EE2 may extend parallel to the second middle branch portion EC2, the third outer branch portion EE3 may extend parallel to the third middle branch portion EC3, and the fourth outer branch portions EC4 may extend parallel to the fourth middle branch portion EC4. Liquid crystal molecules of the liquid crystal layer LC that overlap the first pixel electrode PE1 may be obliquely disposed in an extending direction of each of the first to fourth outer branch portions.

An extending direction of the electrode gap GP may form one of an acute angle or an obtuse angle with an extending direction of each of the outer branch portions EE of the first electrode PE1. Also, the extending direction of the electrode gap GP may form one of an acute angle or an obtuse angle with an extending direction of each of the middle branch portions EC of the second electrode PE2.

Since the electrode gap GP extends in the first direction DR1 and the second direction DR2, and each of the outer branch portions EE and the middle branch portions EC extends in an oblique direction with respect to the first direction DR1 and the second direction DR2, the extending direction of the electrode gap GP is not orthogonal to the extending directions of the outer branch portions EE and the middle branch portions EC.

Figure 7:
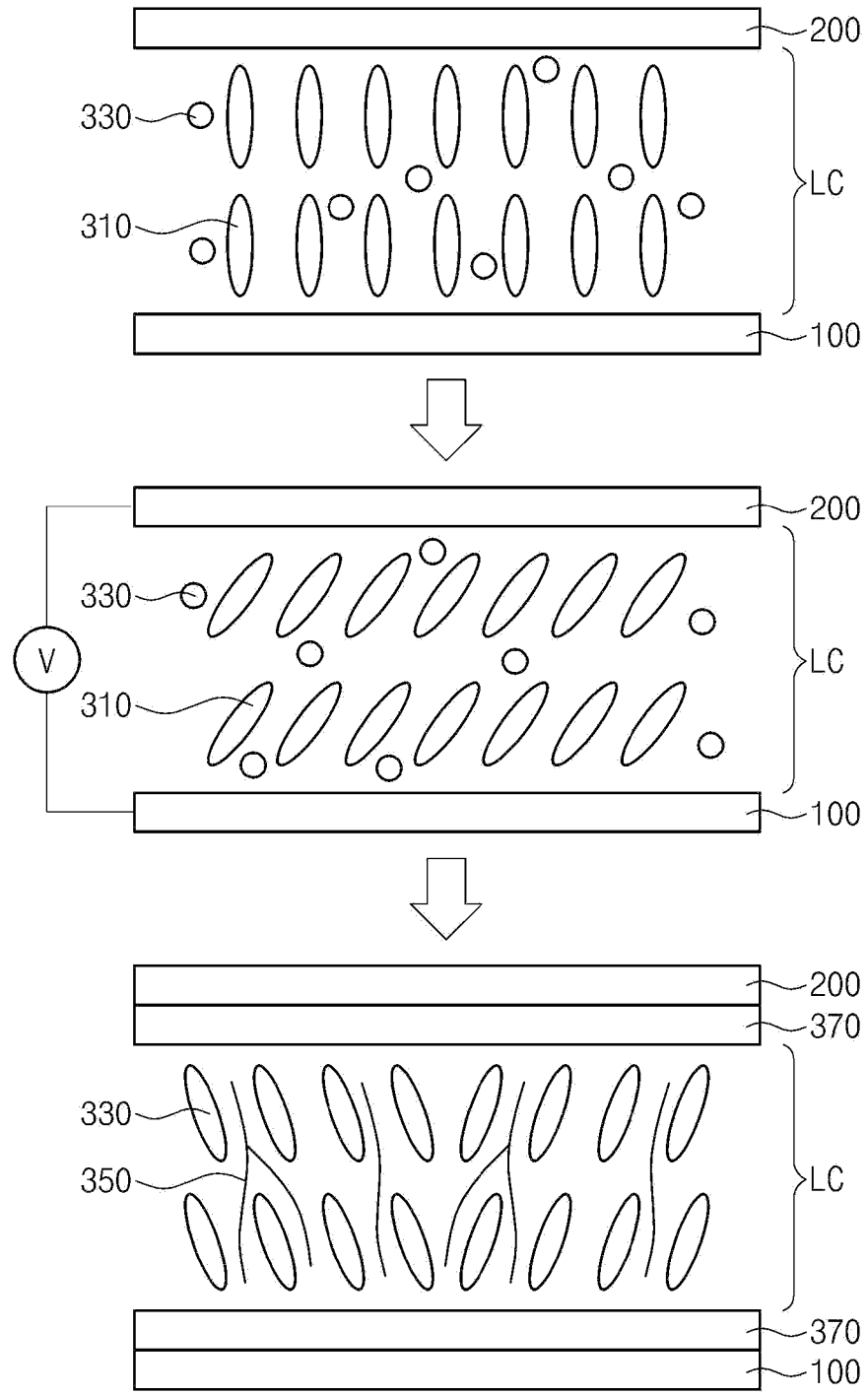
FIG. 7 is a view illustrating a process in which liquid crystal molecules have a linear slope using a prepolymer polymerized by radiation, such as ultraviolet radiation.

FIG. 7 is a view illustrating a process in which liquid crystal molecules are formed to have a linear slope using a prepolymer that is polymerized by radiation, such as ultraviolet radiation.

With reference to FIGS. 2 to 4 and FIG. 7, a method of initially orienting liquid crystal molecules 310 such that the molecules have a linear slope will be described.

Initially, a prepolymer 330, such as a monomer or the like capable of being cured through polymerization by radiation, such as ultraviolet radiation, is formed between first substrate 100 and second substrate 200 together with a liquid crystal material 310. The prepolymer 330 may be a reactive mesogen polymerizable by radiation, such as ultraviolet radiation.

Thereafter, a first voltage is applied between the first pixel electrode PE1 and the common electrode CE, and a second voltage different from the first voltage is applied between the second pixel electrode PE2 and the common electrode CE. An electric field is applied to the liquid crystal layer LC by the first voltage and the second voltage. The liquid crystal molecules 310 of the liquid crystal layer LC are inclined/oriented in a longitudinal direction of the outer branch portions EE or in a longitudinal direction of the middle branch portions EC in response to the electric field. The directions in which the liquid crystal molecules 310 are inclined/oriented are four directions in total.

After the electric field is formed in the liquid crystal layer LC, radiation such as ultraviolet radiation or the like is irradiated and the prepolymer 330 is polymerized to form a first polymer 350 and a second polymer 370 as shown in FIG. 7.

The first polymer 350 is formed within the liquid crystal layer LC and the second polymer 370 is formed contacting the first substrate 100 and the second substrate 200. The orientation direction of the liquid crystal molecules 310 is determined by the first and second polymers 350, 370 that fix the orientations formed by the applied electric field such that the liquid crystal molecules 310 have linear slopes in the longitudinal direction of the outer branch portions EE or in the longitudinal direction of the middle branch portions EC. After the orientation direction of the liquid crystal molecules is determined, even when a voltage is not applied to the first pixel electrode PE1, the second pixel electrode PE2, and the common electrode CE, the liquid crystal molecules 310 are configured with linear slopes in four different directions.

Since the liquid crystal molecules (hereinafter, referred to as textured liquid crystal molecules) that overlap the electrode gap GP do not overlap the first pixel electrode PE1 and the second electrode PE2, the liquid crystal molecules are not oriented by the first and second voltages applied to the first and second pixel electrodes. When the liquid crystal molecules that overlap the electrode gap GP are disposed in different directions from an extending direction of adjacent middle branch portions EC or adjacent outer branch portions EE, a texture may be visible to a viewer.

When a voltage ratio of the second voltage to the first voltage (the second voltage/the first voltage, herein after, referred as voltage ratio) is small (close to zero), the probability that the textured liquid crystal molecules are arranged in the same direction as the adjacent middle branch portions EC and the adjacent outer branch portions EE is high, but when the voltage ratio is high (as the ratio is close to 1), the probability that the textured liquid crystal molecules are arranged in an opposite direction to the adjacent middle branch portions EC and the adjacent outer branch portions EE is high, so that the texture is more problematic at a high voltage ratio. Especially, when the ratio is from 0.9 to 1, the texture may be more acutely visible.

Figure 8:
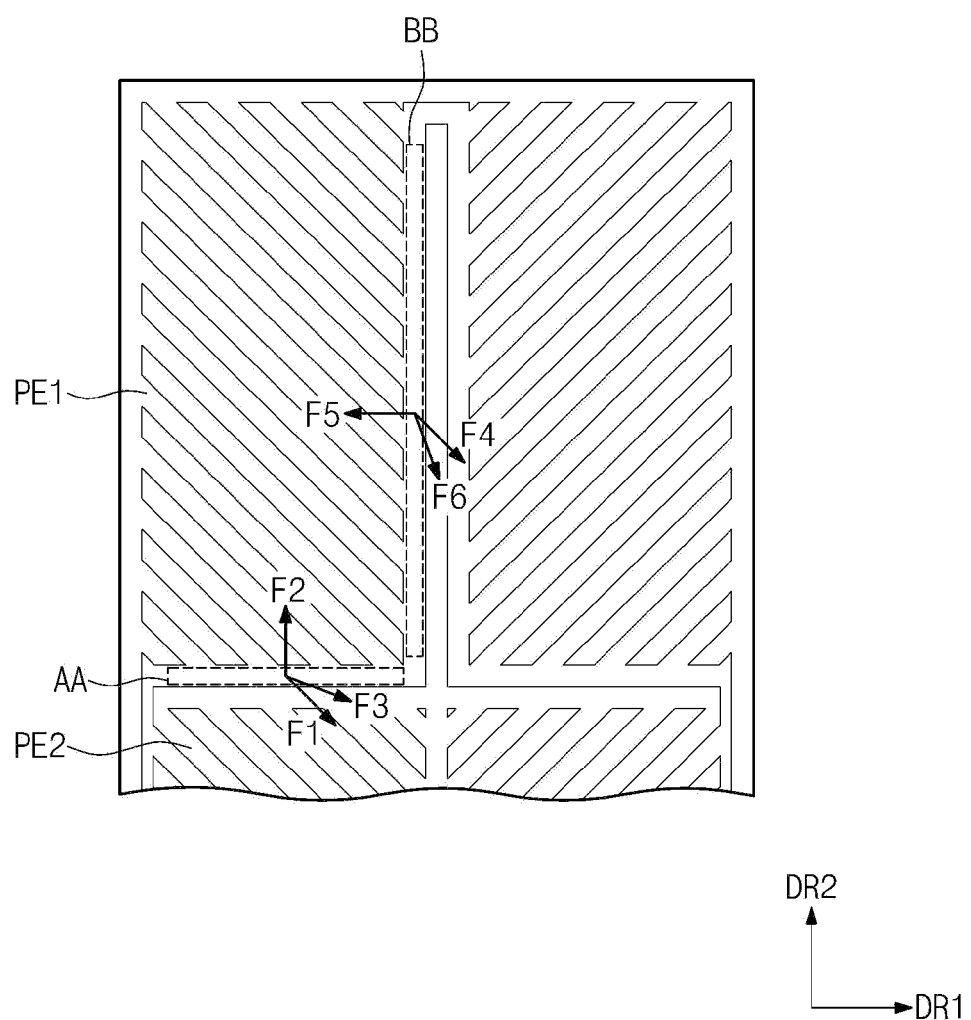
FIG. 8 is a plan view illustrating a portion of a first pixel electrode and a portion of a second pixel electrode, for explaining an orientation direction of overlapping textured liquid crystal molecules.

FIG. 8 is a plan view illustrating a portion of a first pixel electrode and a portion of a second pixel electrode for explaining an orientation direction of textured liquid crystal molecules overlapping the electrode gap. With reference to FIG. 5 and FIG. 8, the orientation direction of textured liquid crystal molecules will be described.

Hereinafter, textured liquid crystal molecules in a first portion area AA and textured liquid crystal molecules in a second portion area BB will be described as an example.

In the first portion area AA, the textured liquid crystal molecules are subject to a first force F1 allowing the textured liquid crystal molecules to be arranged parallel to the extending direction of the outer branch portions EE and a second force F2 allowing the textured liquid crystal molecules to be arranged perpendicular to the extending direction of the upper horizontal branch portion EHU at the same time. When a width of the upper horizontal branch portion EHU is in a range of 1 µm to 5 µm, the second force F2 may be generated to the most appropriate magnitude. When the width of the upper horizontal branch portion EHU is less than 1 µm, the second force F2 is not generated above a predetermined magnitude, and when the width of the upper horizontal branch portion EHU is more than 5 µm, the magnitude of the force F2 is greater than that of the first force F1. The lower horizontal branch portion EHL may have the same width as the upper horizontal branch portion EHU.

The textured liquid crystal molecules are finally subjected to a third force F3 that is a sum vector of the first force F1 and the second force F2. At this time, since the first force F1 is greater than the second force F2, a direction of the third force F3 is roughly towards a lower right direction similar to a direction of the first force F1. Therefore, since the orientation direction of the textured liquid molecules is determined in the first portion area AA, the texture may not be visible.

In the second portion area BB, the textured liquid crystal molecules are subject to a fourth force F4 allowing the textured liquid crystal molecules to be arranged parallel to the extending direction of the outer branch portions EE and a fifth force F5 allowing the textured liquid crystal molecules to be arranged perpendicular to the extending direction of the vertical branch portion EV at the same time. The textured liquid crystal molecules are finally subject to a sixth force F6 that is a sum vector of the fourth force F4 and the fifth force F5. At this time, since the fourth force F4 is greater than the fifth force F5, a direction of the sixth force F6 is roughly towards a lower right direction similar to a direction of the fourth force F4. Therefore, since the orientation direction of the textured liquid crystal molecules is determined in the second portion area BB, the texture may not be visible.

According to the above embodiments showing a liquid crystal display apparatus and a manufacturing method thereof, a texture that is visible in an area between pixel electrodes may be reduced.

The above-disclosed subject matter is to be considered illustrative, and not restrictive, and the appended claims are intended to cover all such modifications, enhancements, and other embodiments, which fall within the spirit and scope of the inventive concept. Accordingly, the embodiments and drawings disclosed in the present disclosure are not intended to limit the technical spirit of the present disclosure, but are illustrative. The scope of the technical spirit of the present disclosure is not limited by the embodiments and drawings, and the scope of the present disclosure should be interpreted based on the following appended claims. Accordingly, all technical embodiments falling within an equivalent range should be construed to be included in the scope of the present disclosure.

What is claimed is:

1. A liquid crystal display apparatus, comprising:
 a first pixel electrode disposed in a first area, the first pixel electrode comprising a plurality of outer branch portions spaced apart from each other;
 a second pixel electrode disposed in a second area spaced apart from the first area with an electrode gap therebetween and surrounded by the first area, the second pixel electrode comprising:
   a plurality of middle branch portions spaced apart from each other;
   an upper horizontal stem portion extending in a first direction and obliquely connected to the middle branch portions;
   a vertical stem portion extending in a second direction perpendicular to the first direction to intersect the upper horizontal stem portion; and
   a lower horizontal stem portion extending in the first direction, spaced apart from and facing the upper horizontal stem portion, and obliquely connected to the middle branch portions;
 a common electrode facing the first pixel electrode and the second pixel electrode; and
 a liquid crystal layer comprising a plurality of liquid crystal molecules, in which orientation states of the liquid crystal molecules are determined by voltage levels of the first pixel electrode, the second pixel electrode, and the common electrode,
 wherein an extending direction of the electrode gap forms one of an acute angle or an obtuse angle with an extending direction of each of the outer branch portions, and the extending direction of the electrode gap forms one of an acute angle or an obtuse angle with an extending direction of each of the middle branch portions.

2. The liquid crystal display apparatus of claim 1, wherein the second pixel electrode further comprises,
 a middle horizontal stem portion extending in the first direction disposed between and spaced apart from the upper horizontal stem portion and the lower horizontal stem portion.

3. The liquid crystal display apparatus of claim 2, wherein an extending direction of the electrode gap is in the first direction and the second direction.

4. The liquid crystal display apparatus of claim 2, wherein the middle branches are obliquely connected to the middle horizontal stem portion, the upper horizontal stem portion, lower horizontal stem portion, and the vertical stem portion.

5. The liquid crystal display apparatus of claim 2, wherein the middle horizontal stem portion and the vertical stem portion partition the second area into a plurality of middle domains, and the middle branch portions in each of the middle domains extend parallel to each other and an extending direction of the middle branch portions in one middle domain is different from that in another middle domain.

6. The liquid crystal display apparatus of claim 5, wherein each of the middle domains has a substantially square shape.

7. The liquid crystal display apparatus of claim 5, wherein each of the upper horizontal stem portion and the lower horizontal stem portion has a width in a range of about 1 μm to about 5 μm.

8. The liquid crystal display apparatus of claim 5, wherein a shape formed by the upper horizontal stem portion, the lower horizontal stem portion, the middle branch portions, and slits between the middle branch portions is substantially a square shape.

9. The liquid crystal display apparatus of claim 5, wherein the upper horizontal stem portion, the lower horizontal stem portion, and the vertical stem portion partition the first area into a plurality of outer domains, and the outer branch portions in each of the outer domains extend parallel to each other and the extending direction of the outer branch portions in one outer domain is different from that in another outer domain.

10. The liquid crystal display apparatus of claim 9, wherein each of the outer domains has a substantially square or substantially rectangular shape.

11. The liquid crystal display apparatus of claim 9, wherein the middle domains comprise first to fourth domains adjacent to each other, and the outer domains comprise first to fourth outer domains adjacent to each of the first to the fourth middle domains within each of the areas that are partitioned by the middle horizontal stem portion and the vertical stem portion.

12. The liquid crystal display apparatus of claim 11, wherein the middle branch portions comprise:
 a first middle branch portion disposed within the first middle domain;
 a second middle branch portion disposed within the second middle domain;
 a third middle branch portion disposed within the third middle domain; and
 a fourth middle branch portion disposed within the fourth middle domain.

13. The liquid crystal display apparatus of claim 12, wherein the outer branch portions comprise:

a first outer branch portion disposed within the first outer domain;
 a second outer branch portion disposed within the second outer domain;
 a third outer branch portion disposed within the third outer domain; and
 a fourth outer branch portion disposed within the fourth outer domain.

14. The liquid crystal display apparatus of claim 13, wherein the first middle branch portion and the first outer branch portion extend in the same direction,
 the second middle branch portion and the second outer branch portion extend in the same direction,
 the third middle branch portion and the third outer branch portion extend in the same direction, and
 the fourth middle branch portion and the fourth outer branch portion extend in the same direction.

15. The liquid crystal display apparatus of claim 1, wherein the first pixel electrode further comprises an edge portion formed along an edge of the first area and obliquely connected to the outer branch portions.

16. A manufacturing method of a liquid crystal display apparatus, the method comprising:
 forming a first substrate comprising:
 a first pixel electrode disposed in a first area, the first pixel electrode comprising a plurality of outer branches spaced apart from each other;
 a second pixel electrode disposed in a second area spaced apart from the first area with an electrode gap therebetween and surrounded by the first area, the second pixel electrode comprising:
  a plurality of middle branch portions spaced apart from each other;
  an upper horizontal stem portion extending in a first direction and obliquely connected to the middle branch portions,
  a vertical stem portion extending in a second direction perpendicular to the first direction to intersect the upper horizontal stem portion; and
  a lower horizontal stem portion extending in the first direction, spaced apart from and facing the upper horizontal stem portion, and obliquely connected to the middle branch portions;
 forming a second substrate on which a common electrode is formed;
 forming a liquid crystal layer including a prepolymer between the first substrate and the second substrate;
 applying a first voltage between the first pixel electrode and the common electrode, and applying a second voltage different from the first voltage between the second pixel electrode and the common electrode to orient molecules of the liquid crystal layer; and
 fixing an orientation of the molecules of the liquid crystal layer by irradiating the liquid crystal and prepolymer layer to polymerize the prepolymer layer,
 wherein an extending direction of the electrode gap forms one of an acute angle or an obtuse angle with an extending direction of each of the outer branch portions, and the extending direction of the electrode gap forms one of an acute angle or an obtuse angle with an extending direction of each of the middle branch portions.

17. The method of claim 16, wherein a voltage ratio of the second voltage to the first voltage is between about 0.9 and about 1.

* * * * *